UNITED STATES PATENT OFFICE.

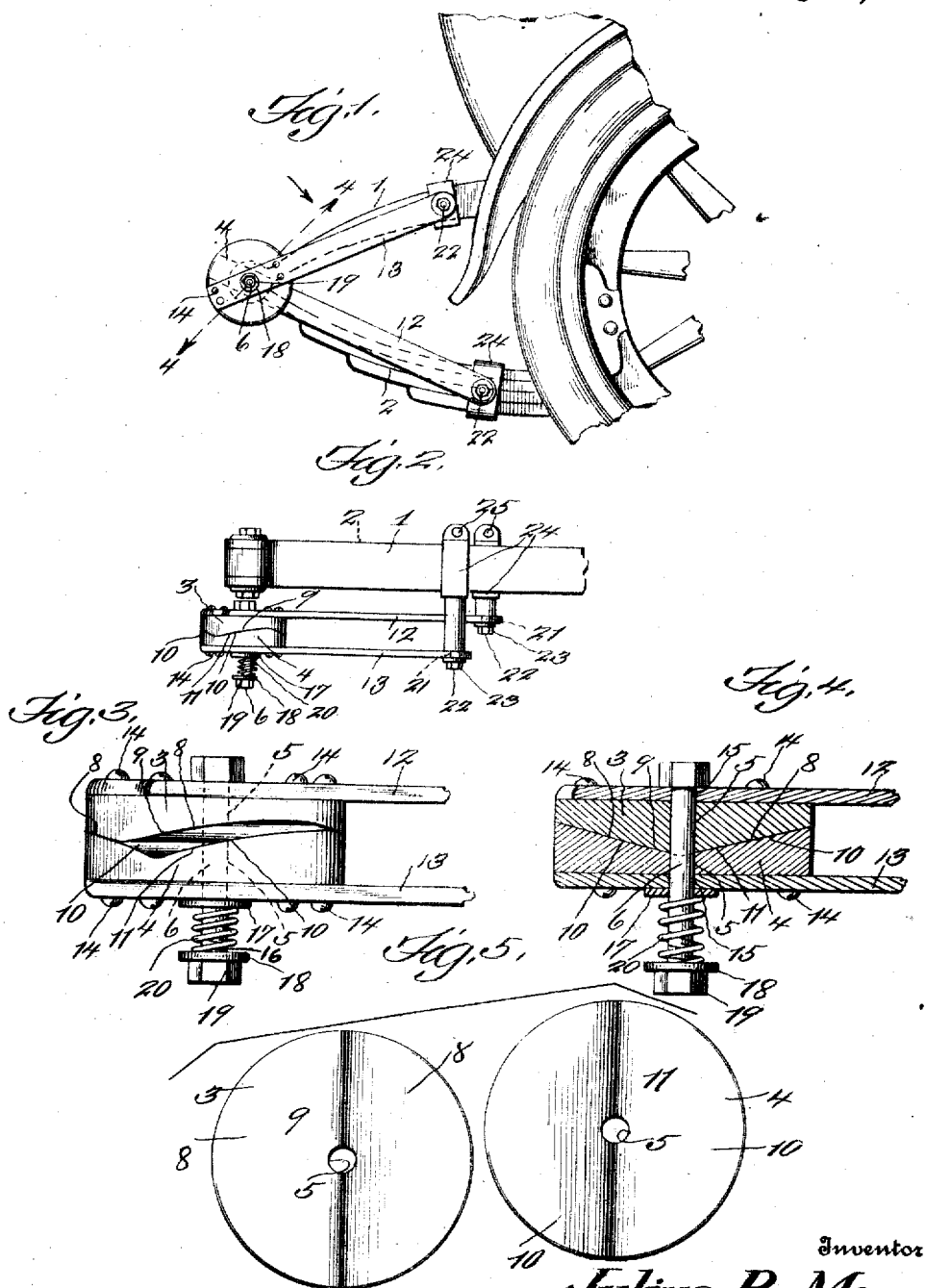

JULIUS B. MOORE, OF DURANGO, COLORADO.

SHOCK-ABSORBER FOR AUTOMOBILES AND OTHER VEHICLES.

1,349,781.

Specification of Letters Patent.   Patented Aug. 17, 1920.

Application filed September 24, 1919.   Serial No. 326,089.

*To all whom it may concern:*

Be it known that I, JULIUS B. MOORE, a citizen of the United States, residing at Durango, in the county of La Plata and State of Colorado, have invented certain new and useful Improvements in Shock-Absorbers for Automobiles and other Vehicles, of which the following is a specification, reference being had to the accompanying drawings.

This invention relates to an improved shock absorber for automobiles and other vehicles, and as an object of the invention, it is the aim to provide a shock absorber of the friction or binding type, and particularly to one which is adapted for application to the springs of the automobile or vehicle, whereby as the upper half of the spring moves or actions downwardly, a friction or binding action is created between the parts of the shock absorber, so as to absorb the shock.

Another object of the invention is the provision of a friction or binding shock absorber, which acts to absorb the shock either upon the down movement of the upper half of the elliptical spring or upon the rebound movement of the opposite parts of the spring.

A further object of the invention is the provision of a shock absorber, comprising opposed parts, having interfitting corresponding cam faces, combination with means for holding the opposed parts concentrically relatively to each other including yieldable means coöperating with the securing means for holding the interfitting cam faces in engagement with each other normally.

A still further object of the invention is the provision of means carried by the opposed concentrically arranged parts for attaching the shock absorber to the opposite halves of the spring, so that the shock absorber may be applied to springs of automobiles now in use. However, it is obvious that it is possible to construct a spring at the time of building an automobile or other vehicle with the concentric opposed cam faced parts forming parts of the spring, so that as the upper and lower halves of the spring move toward and from each other owing to the vibration of the body of the vehicle, the opposed friction or binding cam faces will bind and absorb the shocks, either on the down movement of the upper half of the spring or upon the rebound of the parts of the spring.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed The invention comprises further features and combination of parts, as will be hereinafter set forth, shown in the drawings and claimed.

In the drawings:

Figure 1 is a view in side elevation of the rear portion of an automobile, showing the improved shock absorber as applied thereto.

Fig. 2 is a plan view of the shock absorber showing its application to the rear spring of an automobile.

Fig. 3 is an enlarged edge or plan view, more clearly showing the coöperating friction cam faces of the opposed parts or disks of the shock absorber, showing the opposed parts as having been moved.

Fig. 4 is a sectional view on line 4—4 of Fig. 1.

Fig. 5 discloses face views of the adjacent faces of the concentrically arranged opposed parts or disks of the shock absorber.

Referring more especially to the drawings, 1 designates the rear curved end of a portion of the frame or chassis of an automobile and 2 denotes the rear portion of one of the rear springs of the automobile, which is pivotally connected to the rear extremity of the curved portion 1 of the chassis. The shock absorber (which comprises circular opposed disks 3 and 4) is applied to the rear part of the chassis and the rear spring, whereby the pivotal connection between the concentrically arranged opposed disks or parts is alined axially with the pivot between the spring and the rear end of the chassis. These disks are provided with central apertures 5 for the reception of a pivot bolt 6. These opposed disks may be constructed of brass, though not necessarily, for it is obvious that they may be constructed of any other suitable metal, and their adjacent faces are provided with interfitting irregular cam faces. In other words, the inner face of the disk 3 is bulged V-shaped, while the inner face of the disk 4 is counter-sunk V-shaped. Obviously, the counter-sunk V-shaped face receives the bulged V-shaped face, and it is obvious that when these disks are moved annularly, one in one direction and one in the opposite direction and relatively concentrically to each other, the inclined portions 8 of the bulged V-shaped face 9 will coöperate with and cam upon the inclined faces 10 of the counter-sunk V-shaped face 11 of the disk 4, thereby creating a binding or friction action between said faces. Arms 12 and 13 are secured to the outer faces of the disks preferably by means of screws 14, though not necessarily, for it is obvious that these arms may form a part of the disks, provided the disks are constructed of steel or other similar material, of which the arms are designed to be constructed. However, in the present instance, as previously stated, the disks are preferably made of brass, hence it is necessary to secure the arms to the outer faces of the disks by screws, since it is the aim to construct the arms of different material than the material used in the disks, say for instance steel or the like. It has been found essential to construct the arms of steel, since there is a greater strain upon the arms than upon the disks and furthermore, since it is necessary to replace worn-out disks by new disks.

The bolt 6 also passes through the openings 15 of the arms, and mounted upon the projecting end 16 of the bolt is a pair of washers 17 and 18, the washer 17 being adjacent one face of one of the arms, while the washer 18 is near the outer end of the bolt and under a nut 19. Interposed between the two washers, and in surrounding relation to the bolt is a coil spring 20. This spring is designed to be constructed of resilient material and acts to urge considerable force between the washers, to hold the cam faces normally interfitting, that is to say prior to pressure being exerted on the spring. However, when pressure is exerted on the spring, the opposed disks 3 and 4 will rotate relatively to each other, and owing to the force or action of the spring, the interfitting cam faces of the disks will frictionally bind, and thereby absorb the shocks, either from the compression of the opposite halves of the spring, or upon the rebound movements of the opposite halves of the spring. The arms 12 and 13 are provided with openings or apertures 21, to receive bolts 22, for holding the arms to the opposite halves of the spring.

The bolts 22 are carried by clamping clips 24, which engage about the chassis 1 and the spring 2, and are secured in position by the bolts 25, which pass through and secure the ears of the clamping clips.

While the shock absorber is illustrated as being applied to the rear end of the chassis or frame and the rear spring, it is obvious that it may be applied to the forward end of the chassis and the forward spring in a similar manner. Furthermore, it is obvious that this shock absorber may be applied to an elliptical spring, either at the opposite ends of the spring, so that its pivot bolt 6 may be arranged axially in alinement with the pivots of the opposite halves of the spring, or a single shock absorber may be applied substantially midway the opposite ends of an elliptical spring with its arms connected in a manner similarly shown in the drawings to the upper and lower halves of the spring. These various applications of the shock absorber may be adopted, without departing from the spirit of the invention, for it is obvious the principle and operation remains the same, regardless of its application.

The invention having been set forth, what is claimed as new and useful is:

The combination with a bowed vehicle spring and a chassis or frame, one end of which is connected to one end of the spring, of a shock absorber disposed coaxially with the connection between the ends of the spring and the chassis, said shock absorber comprising a pair of concentrically arranged opposed members, arms secured to the outer faces of the members, and arranged at an acute angle, said arms being in turn pivotally mounted on the chassis and the spring, the inner face of one of said members being of concavely V-shaped formation, the meeting crotch of the concavely V-shaped face extending across the diameter of the member, thereby providing broad sloping solid cam faces of semi-circular outline, the inner face of the adjacent member being convexly V-shaped, the apex thereof extending across the diameter of the member, thereby providing broad sloping solid cam faces of semi-circular outline, whereby the apex may enter the crotch, and also whereby the broad solid camming surfaces may coöperate for absorbing the shock, and means passing concentrically through said members and including relatively strong compression means for urging pressure on the outer faces of the members, to hold them in frictional contact, whereby as the arms move with the chassis and the spring, the broad solid camming faces will act together with the compression means to absorb the shocks.

In testimony whereof I hereunto affix my signature.

JULIUS B. MOORE.